(12) United States Patent
Österling et al.

(10) Patent No.: US 9,130,960 B2
(45) Date of Patent: Sep. 8, 2015

(54) METHOD AND APPARATUS FOR INFLUENCING THE SELECTION OF PEER DATA SOURCES IN A P2P NETWORK

(75) Inventors: Jacob Österling, Järfälla (SE); András Császár, Budapest (HU); Anne-Marie Bosneag, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 712 days.

(21) Appl. No.: 13/132,582

(22) PCT Filed: Dec. 2, 2008

(86) PCT No.: PCT/EP2008/066660
§ 371 (c)(1),
(2), (4) Date: Jun. 2, 2011

(87) PCT Pub. No.: WO2010/063314
PCT Pub. Date: Jun. 10, 2010

(65) Prior Publication Data
US 2011/0243024 A1    Oct. 6, 2011

(51) Int. Cl.
*H04L 1/00* (2006.01)
*H04L 12/28* (2006.01)
*H04L 29/08* (2006.01)

(52) U.S. Cl.
CPC .......... *H04L 67/104* (2013.01); *H04L 67/1021* (2013.01); *H04L 67/1023* (2013.01); *H04L 67/2819* (2013.01); *H04L 67/2828* (2013.01)

(58) Field of Classification Search
CPC .................................................. H04W 24/00
See application file for complete search history.

(56) References Cited

U.S. PATENT DOCUMENTS

| 6,622,157 B1 * | 9/2003 | Heddaya et al. ............... 709/202 |
| 2003/0202468 A1 * | 10/2003 | Cain et al. ...................... 370/229 |
| 2007/0230482 A1 | 10/2007 | Shim et al. |
| 2008/0119180 A1 * | 5/2008 | Small et al. ................. 455/422.1 |

(Continued)

FOREIGN PATENT DOCUMENTS

EP    1821487 A1    8/2007

OTHER PUBLICATIONS

Notification of Transmittal of the International Preliminary Report on Patentability and International Preliminary Report on Patentability, PCT Application No. PCT/EP2008/066660, Dec. 2, 2008 (18 pages).

(Continued)

*Primary Examiner* — Samina Choudhry
(74) *Attorney, Agent, or Firm* — Myers Bigel Sibley & Sajovec, PA

(57) ABSTRACT

Disclosed is a method of selecting a data source node from a plurality of data source nodes, the selected data source node being used to send data to a data requesting node over a packet data network. The method includes, at an intermediate node of the network, intercepting at least one message sent to or from the data requesting node, the message(s) relating to data source node suitability, determining a cost of communication between the data requesting node and each of the data source nodes to which the message(s) relate, and influencing data source node suitability information sent to the data requesting node to take account of the cost to enable the data requesting node to use the information to select a data source node.

16 Claims, 9 Drawing Sheets

(56) References Cited

U.S. PATENT DOCUMENTS

2008/0232284 A1* 9/2008 Dalsgaard et al. ............ 370/310
2009/0180480 A1* 7/2009 Hilt et al. ................ 370/395.21

OTHER PUBLICATIONS

Notification of Transmittal of the International Search Report and the Written Opinion of the International Searching Authority, or the Declaration and International Search Report, PCT Application No. PCT/EP2008/066660, Sep. 23, 2009 (19 pages).

Written Opinion of the International Preliminary Examining Authority, PCT Application No. PCT/EP2008/066660, Mar. 1, 2011 (9 pages).

Second and Supplementary Notice Informing the Applicant of the Communication of the International Application, PCT Application No. PCT/EP2008/066660, Apr. 7, 2011 (1 page).

Bindal R et al., "Improving Traffic Locality in BitTorrent via Biased Neighbor Selection," Distributed Computing Systems, 2006, ICDCS 2006, 26th IEEE International Conference on Lisboa, Portugal, Jul. 4, 2006, Piscataway, NJ, USA, pp. 1-9.

Haiyong Xie et al., "P4P: Provider Portal for Applications," SIGCOMM'08 Proceedings, Seattle, Washington, USA, Aug. 17, 2008, pp. 351-362.

Lihang Ying et al., "Traceroute-Based Fast Peer Selection Without Offline Database," Multimedia, 2006, ISM'06, Eight IEEE International Sumposium on, IEEE, P1, Dec. 1, 2006, pp. 609-614.

Haiyong Xie et al, "P4P: Explicit Communications for Cooperative Control Between P2P and Network Providers," pp. 1-7.

Kiesel S et al, "Application Layer Traffic Optimization (ALTO) Requirements; draft-kiesel-alto-reqs-01.txt," Internet Engineering Task Force, IETF; Standard Working Draft, Internet Society (ISOC) 4, Rue des Falaises CH-1205 Geneva, Switzerland, No. 1, Nov. 3, 2008.

Katz et al., "Traffic Engineering (TE) Extensions to OSPF Version 2," Network Working Group, Sep. 2003, pp. 1-13.

Pereira et al., "On the Impact of P2P File Sharing Traffic Restrictions on User Perceived Performance", *International Conference on Information Networking, ICOIN*, Jan. 2008, retrieved on Mar. 5, 2013 at URL: http://ieeexplore.ieee.org/xpls/abs_all.jsp?arnumber=4472802.

* cited by examiner

METHOD AND APPARATUS FOR INFLUENCING THE SELECTION OF PEER DATA SOURCES IN A P2P NETWORK

CROSS REFERENCE TO RELATED APPLICATIONS

This application is a 35 U.S.C. §371 national stage application of PCT International Application No. PCT/EP2008/066660, filed on 2 Dec. 2008, the disclosure and content of which is incorporated by reference herein in its entirety. The above-referenced PCT International Application was published in the English language as International Publication No. WO 2010/063314 A1 on 10 Jun. 2010.

TECHNICAL FIELD

The present invention relates to a method and apparatus for influencing collaborative networking, and in particular to a method and apparatus for influencing the routing of messages and data in a collaborative network.

BACKGROUND

Peer-to-peer (P2P) applications, such as those for sharing music, movies and software, have become very popular, such that the majority of IP traffic on the Internet is now caused by P2P applications. The share of Internet traffic taken by P2P applications will continue to grow, particularly as the media industry has identified P2P as an efficient system for content distribution.

In P2P networking, the peers are distributed throughout the physical network and an overlay network can be constructed on top of this physical network in which the nodes are connected by virtual or logical links (that may represent many physical links in the underlying physical network). This overlay network is then used for routing between the nodes in the P2P network. FIG. 1 illustrates schematically an overlay network and the underlying physical network.

In non-structured P2P networks, the content is distributed randomly, whereas in structured P2P networks the location of content is determined by the utilised P2P protocol and, as such, requests for content can be routed by the P2P protocol in order to determine a source for the content.

Typically, a node in a structured P2P network maintains a list of nodes of which it is aware and with whom it collaborates for a specific task. This list of nodes is the P2P routing table and contains the node's neighbours in the collaborative network. For example, in FIG. 1 Peer A's list of neighbouring nodes might include Peer B and Peer D. Structured P2P networks are mostly based on Distributed Hash Tables (DHT) in order to manage the storage and retrieval of data within the network. DHT define a logical keyspace and split ownership of this keyspace between the nodes participating in the P2P network. To store a file, a hashing algorithm (e.g. SHA-1) is applied to the file contents or to its filename, generating a hash which is used as a key for the file. The location at which this file can be found, or the file itself, is then sent to and stored at the node responsible for the area of the keyspace in which this key lies. Generally, when a node wants to obtain this file, it will generate the file key and select a node from within its list of neighbouring nodes whose keyspace is closer to that in which the key lies. The data requesting node will then send a message containing the file key to the selected neighbouring node. This node then forwards the message to a node within its list of neighbouring nodes whose keyspace is closer still to that in which the key lies. The message is forwarded from node to node until it reaches the node responsible for key. For this reason, the selection of the nodes that feature in the list of neighbouring nodes is usually determined in order to minimise the number of hops that are required to reach any other node in the P2P network.

Some structured P2P applications also take account of the topology of the underlying physical network when selecting the nodes that will feature in a nodes list of neighbours and when selecting a node from within that list, with the aim of alleviating unnecessary load in the communication links between the nodes. For example, proximity neighbour selection attempts to construct the list of neighbouring nodes such that it contains the topologically closest nodes among all nodes within the desired portion of the keyspace. Furthermore, when routing a message there can be potentially several nodes in the list of neighbouring nodes that are closer to the message's key in the keyspace. Proximity message routing attempts to select the node that is closest in the physical network or that represents a good compromise between progress in the keyspace and proximity in the physical network. When attempting to account for node proximity, these structured P2P applications often rely on simple Round Trip Time (RTT) measurements e.g. made using 'ping' packets.

Non-structured P2P networks can be further categorised as either pure P2P networks, centralised P2P networks or hybrid P2P networks. In a pure P2P network a node that wants to obtain some data floods the network with a query or request. This data requesting node then receives a response or a number of responses from those nodes that can provide the requested data and must then select one of these possible data sources from which to retrieve the data. Once again, the selection often relies on simple RTT measurements when attempting to take account of the topology of the underlying network.

In a centralised P2P network, a data requesting node sends the request for data to some centralised look-up server or hub that stores a directory or database of the data that each node can provide. The centralised server then returns a list identifying possible source nodes from which the requesting node must select the source(s) it will contact to retrieve the date. In hybrid P2P networks, a routing hierarchy is established within the nodes of the network in which some nodes are defined as 'superpeers'. The other (non-super) nodes of the P2P network send their data requests to their superpeer node, which then returns a list identifying possible source nodes. In other words, each superpeer node acts as a centralized server to a subset of the other nodes in the P2P network. In these P2P networks, the data requesting peer may either make RTT measurements to each of the possible data sources, or will merely attempt to retrieve the data from the sources in the order in which they are listed. In some cases, the server or superpeer may determine the order of the list depending upon the uplink speed of each possible data source node.

In order to optimise the cost of the transport and the performance of collaborative applications (such as the P2P applications described above) it is inefficient to rely on simple RTT measurements or the ordering provided by some server or superpeer, and more detailed knowledge of the network architecture and dynamic conditions within the network is required. However, details of the transport network are often hidden from the end-users.

Proactive network Provider Participation for P2P (P4P) has been proposed as an approach to optimize peer-to-peer connections using a more detailed knowledge of the network. However, this approach is based on a centralized node that offers a global view of the network, and that the P2P client must interact with when selecting which neighbouring nodes to collaborate with. This centralised approach has a number of disadvantages. Firstly, it requires that the user's P2P application must be configured to cooperate with the centralised node. Secondly, the P2P application must contact the centralised P4P node at least once every time they initiate collaborative communication with other peers, placing a significant load on this centralised node. Furthermore, whenever there is a change in the network topology the centralised node must be updated to reflect the new topology.

SUMMARY

It is an object of the present invention to overcome or at least mitigate the problems noted above.

According to a first aspect of the present invention there is provided a method of selecting a data source node from a plurality of data source nodes, the selected data source node being used to send data to a data requesting node over a packet data network. The method comprises, at an intermediate node of the network, intercepting at least one message sent to or from said data requesting node, the message(s) relating to data source node suitability, determining a cost of communication between said data requesting node and the or each data source node to which said message(s) relate, and influencing data source node suitability information sent to said data requesting node to take account of said cost(s) to enable said data requesting node to use the information to select a data source node. The packet data network may be an Evolved Packet System mobile communications network in which the intermediate node can be either an evolved NodeB or a System Architecture Evolution Gateway.

If the message(s) relating to data source node suitability sent to or from said data requesting node are round-trip time request or round-trip time reply messages relating to a data source node, the step of influencing data source node suitability information sent to said data requesting node may comprise influencing the round-trip time reply message sent to said data requesting node from the data source node.

The step of influencing the round-trip time reply message may comprise imposing a delay on the round-trip time reply message sent to the data requesting node from the data source node, such that the round-trip time indicated to the data requesting node depends on the calculated cost of communication between said data requesting node and the data source node. The imposed delay may be proportional to the calculated cost of communication, or alternatively, the imposed delay may be selected from at least a first preconfigured delay and a second preconfigured delay, with the first delay being shorter than the second delay and the first delay being imposed on the round-trip time reply message relating to the data source node with the lowest cost of communication.

Alternatively, the step of influencing the round-trip time reply may comprise generating and sending a simulated round trip-time reply message to the data requesting node, such that the round-trip time indicated to the data requesting node depends on the calculated cost of communication between said data requesting node and the data source node.

If the message(s) relating to data source node suitability sent to or from said data requesting node is a message containing a list of potential data source nodes, the step of influencing data source node suitability information sent to said data requesting node may comprise modifying the list such that the nodes appearing in the list, or the order of the nodes in list, depends on the calculated cost of communication between said data requesting node and the data source nodes.

If the data requesting node is connected to a visited network, and traffic to and from the data requesting node is routed through a home network of the data requesting node, then intermediate node may be a node of the home network.

The cost of communication can be determined based on one or more of:
  the network topology;
  the available bandwidth on network links;
  the administrative cost of network links;
  the load on network links;
  the Quality of Service of the network links;
  the security of the network links; and
  the current/predicted air interface properties.

According to a second aspect of the present invention there is provided a recording medium storing computer interpretable instructions for causing a programmable computer to perform a method of selecting a data source node from a plurality of data source nodes, the selected data source node being used to send data to a data requesting node over a packet data network. The method comprises, upon receipt of at least one message sent to or from said data requesting node, the message(s) relating to data source node suitability, determining a cost of communication between said data requesting node and the or each data source node to which said message(s) relate, and influencing data source node suitability information sent to said data requesting node to take account of said cost(s) to enable said data requesting node to use the information to select a data source node.

According to a third aspect of the present invention there is provided an apparatus for use in a packet data network. The apparatus comprises a receiver for intercepting messages sent to or from a data requesting node, an inspection unit for identifying messages that relate to the suitability of one or more data source nodes for sending data to said data requesting node, a cost control unit for determining the cost of communication between said data requesting node and the or each data source node to which any identified message(s) relate, and influencing data source node suitability information sent to said data requesting node to take account of said cost(s), and a transmitter for sending the data source node suitability information to the data requesting node. The inspection unit may identify messages that relate to the suitability of one or more data source nodes for sending data to said data requesting node using deep packet inspection. The apparatus may be an eNodeB or a System Architecture Evolution Gateway.

The inspection unit may identify round-trip time request messages and round-trip time reply messages sent to or from a data source node, and the cost control unit may influence the round-trip time reply messages sent to said data requesting node. The cost control unit may impose a delay on round-trip time reply messages sent from the data source node to the data requesting node, such that the round-trip time measured by the data requesting node depends on the calculated cost of communication between the data requesting node and the data source node. Alternatively, the cost control unit may generate and send simulated round trip-time reply messages to the date requesting node, such that the round-trip time indicated to the data requesting node depends on the calculated cost of communication between the data requesting node and the data source node.

The inspection unit may identify messages containing a list of potential data source nodes, and the cost control unit may modify the list of potential data source nodes.

The cost control unit may determine the cost of communication based on one or more of:
  the network topology;
  the available bandwidth on network links;
  the administrative cost of network links;

the load on network links;

the Quality of Service of the network links;

the security of the network links; and the current/predicted air interface properties.

According to a fourth aspect of the present invention there is provided a method of constructing and maintaining a routing table at a first node of a collaborative network, the collaborative network being overlaid on a packet data network. The method comprises, at a node of the packet data network, intercepting at least one message sent between said first collaborative network node and one or more second nodes of the collaborative network, the message relating to the suitability of said second collaborative network node(s) as a next hop in a route from the first collaborative network node, determining a cost of communication between said first collaborative network node and the or each second collaborative network node, and influencing second collaborative network node suitability information sent to said first collaborative network node to take account of said cost in order that said first collaborative network node will preferably select the second collaborative network node with the lowest cost of communication when using the routing table to route a message in the collaborative network. The packet data network may be an Evolved Packet System mobile communications network and the node of the packet data network may be either an evolved NodeB or a System Architecture Evolution Gateway.

If the message(s) relating to second collaborative network node suitability are round-trip time request or a round-trip time reply messages relating to a second collaborative network node, the step of influencing correspondent node suitability information sent to said first collaborative network node may comprise influencing the round-trip time reply messages sent to said first collaborative network node from the second collaborative network node. The step of influencing the round-trip time reply messages may comprise imposing a delay on the round-trip time reply messages sent from the second collaborative network node to said first collaborative network node such that the round-trip time measured by the first collaborative network node depends on the calculated cost of communication between said first collaborative network node and the second collaborative network node. Alternatively, the step of influencing the round-trip time reply may comprise generating and sending a simulated round trip-time reply message to the first collaborative network node, such that the round-trip time indicated to the first collaborative network node depends on the calculated cost of communication between said first collaborative network node and the second collaborative network node.

If the first collaborative network node is connected to a visited network, and traffic to and from the first collaborative network node is routed through a home network of the first collaborative network node, the node of the packet data network may be a node of the home network.

According to a fifth aspect of the present invention there is provided a recording medium storing computer interpretable instructions for causing a programmable computer to perform a method of constructing and maintaining a routing table at a first node of a collaborative network, the collaborative network being overlaid on a packet data network. The method comprises, upon receipt of at least one message sent between said first collaborative network node and one or more second nodes of the collaborative network, the message relating to the suitability of said second collaborative network nodes as a next hop in a route from the first collaborative network node, determining a cost of communication between said first collaborative network node and the or each second collaborative network node, and influencing second collaborative network node suitability information sent to said first collaborative network node to take account of said cost in order that said first collaborative network node will preferably select the second collaborative network node with the lowest cost of communication when using the routing table to route a message in the collaborative network.

According to a sixth aspect of the present invention there is provided an apparatus for use in a packet data network. The apparatus comprises a receiver for intercepting messages sent between a first node of a collaborative network node and one or more second nodes of the collaborative network, the collaborative network being overlaid on the packet data network, an inspection unit for identifying messages that relate to the suitability of said second collaborative network nodes as a next hop in a route from the first collaborative network node, a cost control unit for determining the cost of communication between said first collaborative network node and the or each second collaborative network node, and influencing second collaborative network node suitability information sent to said first collaborative network node to take account of said cost, and a transmitter for sending the second collaborative network node suitability information to the first collaborative network node.

According to a seventh aspect of the present invention there is provided a method of optimising the utilisation of resources in a collaborative network. The method comprises, at a node of an access network, the access network being used by a first node of the collaborative network to access the collaborative network, receiving a request message from the first collaborative network node, the message requesting the cost of communication between the first collaborative network node and one or more second nodes of the collaborative network, determining the cost of communication between said first collaborative network node and the or each second collaborative network node, and sending a reply message to the first collaborative network node in order that said first collaborative network node can take into account said cost(s) when selecting one or more of the second collaborative network nodes with which to communicate.

According to an eighth aspect of the present invention there is provided a recording medium storing computer interpretable instructions for causing a programmable computer to perform a method of optimising the utilisation of resources in a collaborative network. The method comprises, upon receipt of a request message from a first node of the collaborative network, the message requesting the cost of communication between the first collaborative network node and one or more second nodes of the collaborative network, determining the cost of communication between said first collaborative network node and the or each second collaborative network node, and sending a reply message to the first collaborative network node in order that said first collaborative network node can take into account said cost(s) when selecting one or more of the second collaborative network nodes with which to communicate.

According to a ninth aspect of the present invention there is provided an apparatus for use in an access network. The apparatus comprises a receiver for receiving a request messages sent from a first node, the access network being used by the first node to access a collaborative network, the message requesting the cost of communication between the first collaborative network node and one or more second nodes of the collaborative network, a cost control unit for determining the cost of communication between said first collaborative network node and the or each second collaborative network node, and a transmitter for sending a reply message to the first collaborative network node.

DETAILED DESCRIPTION

Figure 1:
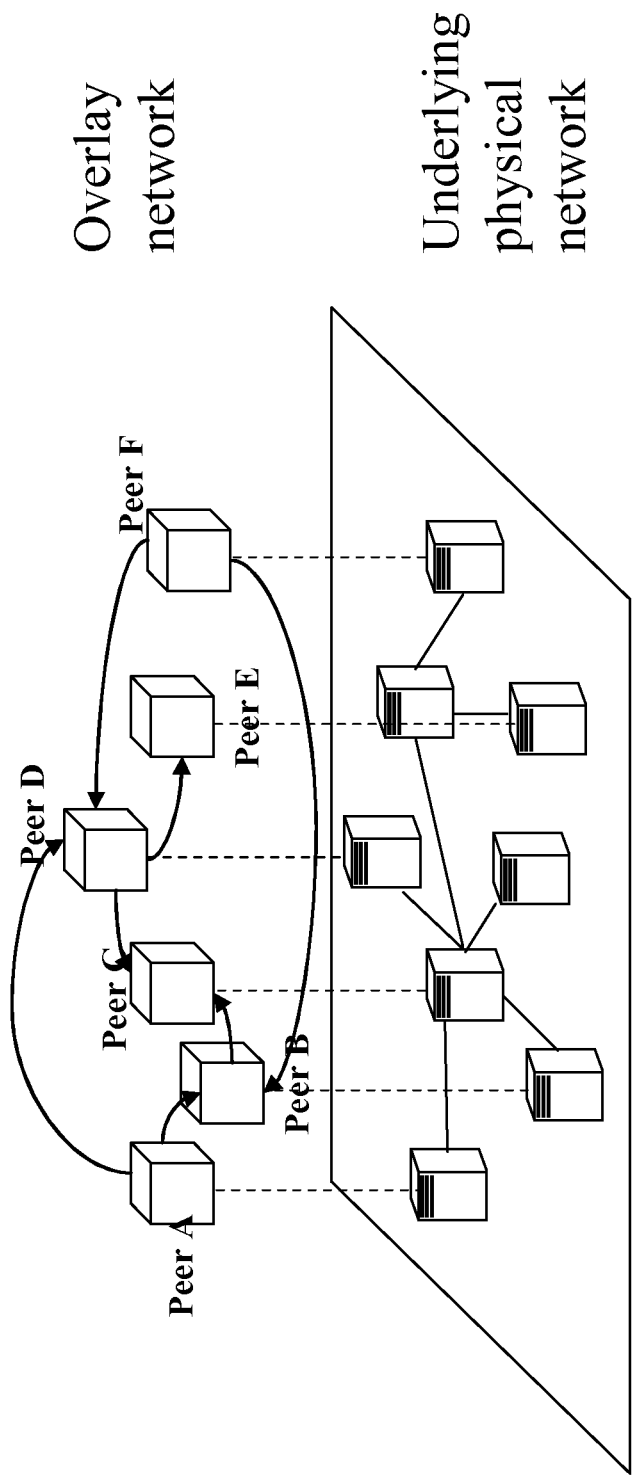
FIG. 1 illustrates schematically an overlay network and the underlying physical network.

There will now be described a method of optimising the bandwidth efficiency of multi-source collaborative networks, such as P2P networks, content distribution networks and Distributed Hash Table creation and maintenance etc, that also mitigates the disadvantages of a centralised solution such as P4P. The method involves providing a new "enabler" function distributed throughout the underlying network that will obtain knowledge of the elements of the underlying network and their dynamic status, and use this knowledge to calculate the cost of communication between a node of the collaborative network, and other nodes of the collaborative network with which it may correspond.

The enabler will then influence the selection, by the node, of one or more correspondent nodes from those possible nodes, such that the node will preferably communicate with the correspondent node with the lowest communication costs. In this regard, the enabler can influence the construction and maintenance of the routing table of a collaborative network node, by influencing the selection of nodes that will feature in the routing table, or influencing the selection of a node from the routing table when routing a request for data, and can also influence the selection of a node from a number of nodes that have been identified to a data requesting node as potential data sources.

The enabler obtains network topology information, collects real-time measurements of the underlying network and determines the cost of communicating with a potential correspondent node based on this real-time network information (e.g. available bandwidth, administrative costs etc). The enabler function is distributed throughout the underlying network such that messages sent to and from nodes using a collaborative application always traverse the nodes that provide the enabler function. The enabler can then influence the selection, by a first node, of second correspondent nodes by intercepting messages used in measuring the RTT, or messages containing a list of nodes, and influencing this such that it reflects the enabler's assessment of the underlying network. Alternatively, the enabler can interact with an application programming interface (API) provided to the collaborative applications within a node to provide an estimate of the cost of communication with the different correspondent nodes.

The RTT measurements used by a collaborative application may be made by sending Internet Control Message Protocol (ICMP) "echo request" packets to the target and listening for ICMP "echo response" replies. In this case, it is straightforward for the enabler to 'catch' these ICMP messages. However, the RTT measurements may alternatively be based on some application-specific mechanism, for which deep packet inspection (DPI) would be required to identify the relevant messages.

Once the enabler has identified the relevant RTT messages the enabler can either impose an artificial delay on the RTT response messages or it can generate 'fake' or simulated RTT response messages in order to influence the RTT measurements. By delaying a response the enabler can prolong the RTT measurement made by a node and thereby discourage selection of those second correspondent nodes that have the highest cost of communication. For example, the imposed delay can be preconfigured (e.g. with a particular delay for preferred nodes and another longer delay for unwanted nodes) or it can vary based on the real-time network measurements made by the enabler. In generating simulated responses the enabler can encourage selection of the preferred correspondent nodes e.g. by sending a response to the first node that ensures the RTT is lower for those second correspondent nodes with the lowest cost of communication.

If the enabler identifies a message as containing a list of possible data source nodes it will use its knowledge of the underlying network to calculate the cost of communicating with each of these nodes, and modify the list to reflect these costs. For example, the enabler may re-order the list to ensure that the node with lowest cost of communication appears first in the list and the node with the highest cost of communication appears last.

Figure 2:
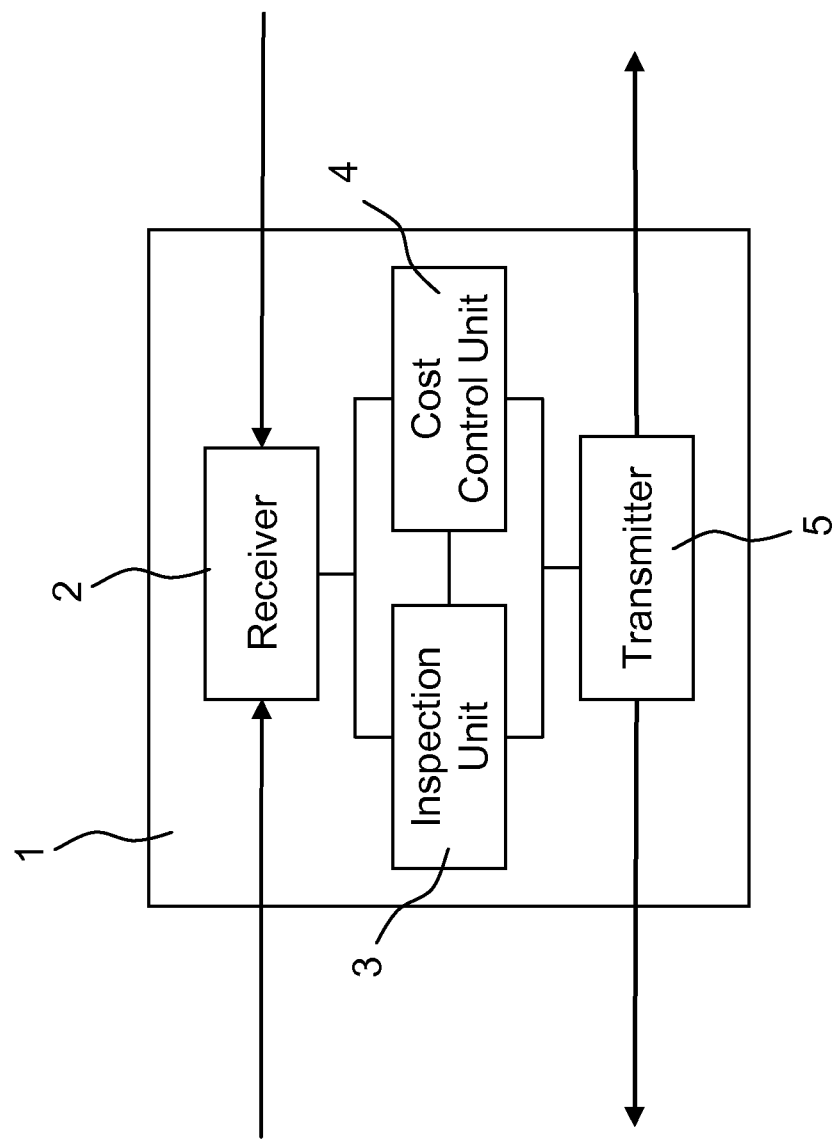
FIG. 2 illustrates a node suitable for providing the enabler function according to an embodiment of the present invention.

FIG. 2 illustrates a node 1 of an underlying packet data network that is suitable for providing the enabler function. The packet data network node 1 is implemented as a combination of computer hardware and software. The packet data network node 1 comprises a receiver 2 for receiving messages sent between a first node of a collaborative network and second correspondent nodes of the collaborative network, an inspection unit 3 for identifying messages that relate to the suitability of the second correspondent nodes, either for sending data to the collaborative network node or as a next hop in a route from the collaborative network node. The packet data network node 1 also comprises a cost control unit 4 for determining the cost of communication between the collaborative network node and the correspondent nodes, and influencing suitability information sent to the collaborative network node to take account of said cost, and a transmitter 5 for sending the suitability information to the first collaborative network node.

Figure 3:
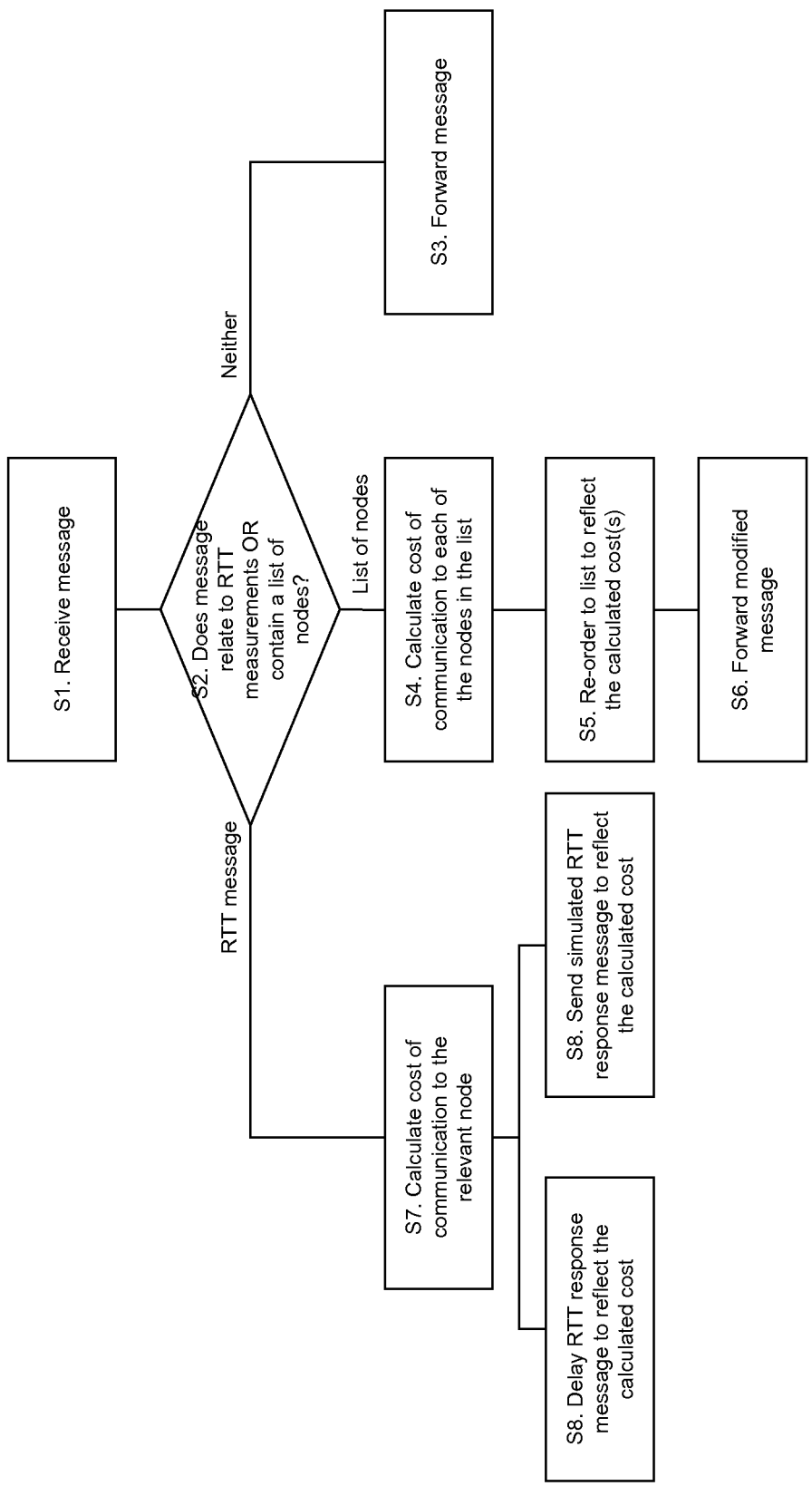
FIG. 3 is a flow diagram illustrating the operation of the enabler according to an embodiment of the present invention.

FIG. 3 is a flow diagram illustrating the process of the enabler influencing the selection of correspondent nodes. The steps performed are as follows:

S1. The enabler function, provided at a node of the underlying network, intercepts a message sent to or from a first node of a collaborative network.

S2. The enabler function determines whether or not the message relates to the suitability of one or more second correspondent nodes of the collaborative network, either as a next hop in routing a request for data or for providing some requested data. For example, the message may be a RTT request message sent to a correspondent node, a RTT response message sent back from a correspondent node, or a list of correspondent nodes sent from a central server or superpeer.

S3. If the enabler determines that the message does not relate to the suitability of one or more correspondent nodes, i.e. it neither relates to an RTT measurement nor contains a list of nodes, then the enabler forwards the message towards its destination.

S4. If the enabler determines that the message contains a list of nodes, it then uses near real-time information obtained from the underlying network to determine the cost of communication between the first collaborative network node and each of the correspondent nodes in the list.

S5. The enabler then modifies or re-orders the list to reflect these calculated cost(s).

S6. The modified list is then forwarded to the collaborative network node.

S7. If the enabler determines that the message relates to RTT measurements, it then uses near real-time information obtained from the underlying network to determine the cost of communication between the first collaborative network node and the correspondent nodes to which the message relates.

S8. The enabler can then either delay the RTT response message returned to the first collaborative network node to reflect these calculated cost or, alternatively, send a simulated RTT response (as discussed above).

Figure 4:
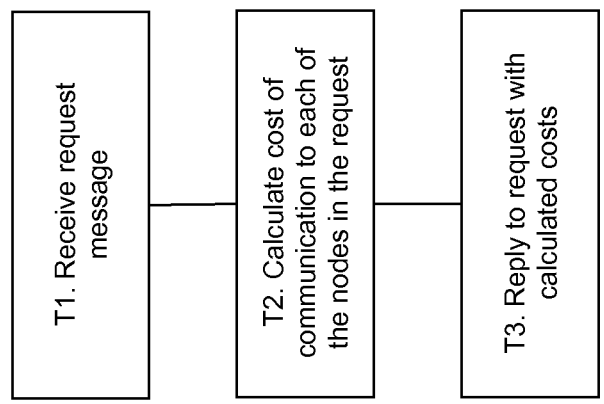
FIG. 4 is a flow diagram illustrating the enabler interacting with an API at a first collaborative network node according to an embodiment of the present invention.

Alternatively, if the node of the collaborative network were to be provided with an appropriate API then the enabler could interact directly with this API in order to influence the selection of correspondent nodes. FIG. 4 is a flow diagram illustrating the process of the enabler interacting with an API at the first collaborative network node. In this case, the steps performed are as follows:

T1. The enabler function receives a request message from a first node of a collaborative network. The message requests the cost of communication between the first collaborative network node and one or more second nodes of the collaborative network.

T2. The enabler function then uses near real-time information obtained from the underlying network to determine the cost of communication between the first collaborative network node and the correspondent nodes to which the message relates.

T3. The enabler then sends a reply message to the to the first collaborative network node, providing the calculated costs, such that the first collaborative network node can take into account said cost(s) when selecting one or more of the second collaborative network nodes with which to communicate.

Due to the high speed offered to end-users and flat rate pricing, it is expected that users attached to High Speed Packet Access (HSPA) and LTE (Long Term Evolution) mobile access networks will run collaborative applications and, as with fixed DSL access, that such collaborative applications will be responsible for the majority of the traffic. However, in these access networks the cost of transport can be very expensive due either to a lack of resources (e.g. relatively low capacity microwave links), or due to the use of rented transmission, for which operators must pay for the bandwidth used. As such, it is desirable to enhance the bandwidth efficiency of these collaborative applications.

Figure 5:
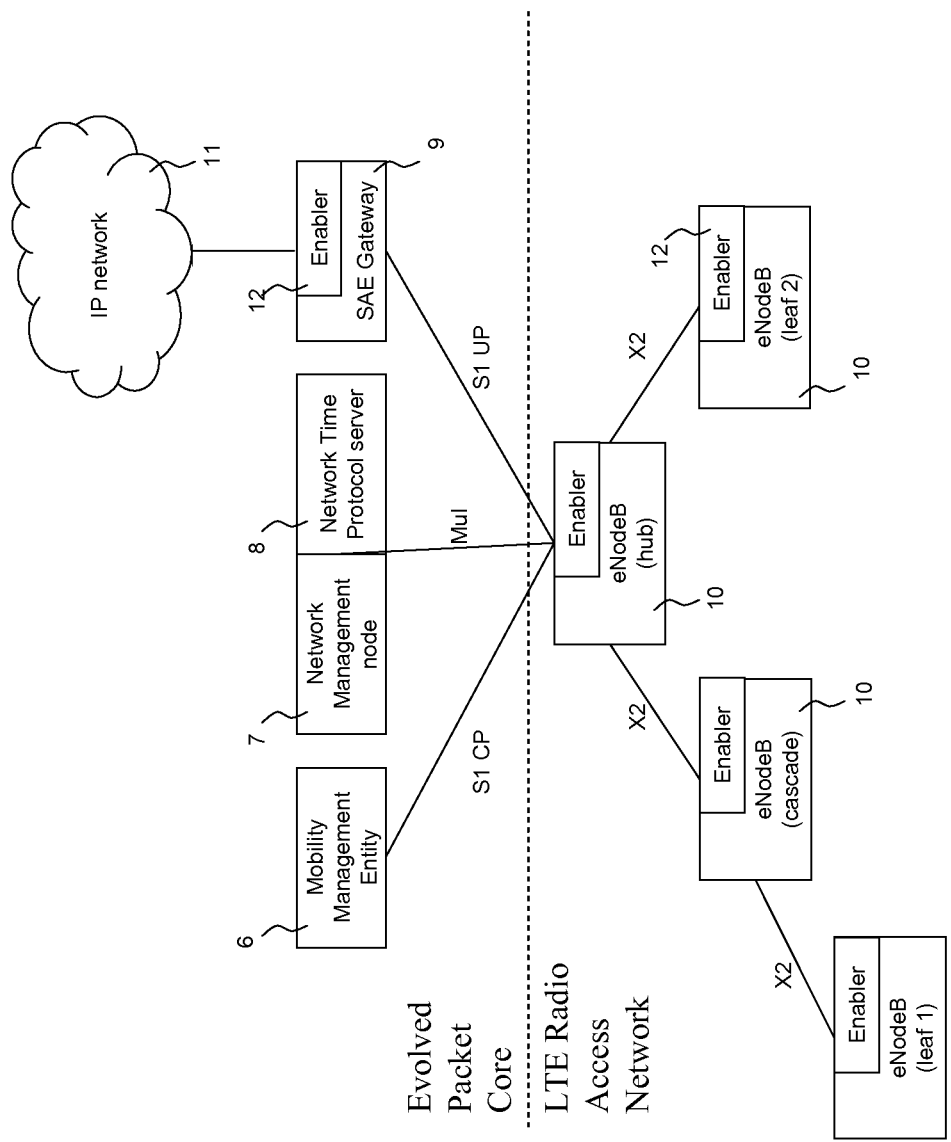
FIG. 5 illustrates schematically an example of the enabler function distributed throughout an Evolved Packet System (EPS) mobile telecommunications network according to an embodiment of the present invention.

FIG. 5 illustrates schematically an example of the enabler function distributed throughout an Evolved Packet System (EPS) mobile telecommunications network, in which user equipment (UEs) (not shown) connected to the Long Term Evolution Radio Access Network (RAN) form a collaborative network. The EPS network includes a Mobility Management Entity (MME) node 6, a Network Management (NM) node 7 and optionally a Network Time Protocol (NTP) server 8, and a System Architecture Evolution gateway (SAE GW) node 9, which can include both packet data network (PDN) gateway and serving gateway functionality. The EPS also includes a number of enhanced NodeBs (eNodeBs) 10. In this example, there are three eNodeB variants:

a hub eNodeB, which aggregates its own traffic with that from other eNodeBs, and feeds this traffic towards the core;

a cascade eNodeB, which aggregates its own traffic with that from other eNodeBs, and feeds this traffic towards another cascade or hub site; and a leaf eNodeB, which terminates the transport network.

The enabler unit 12 is provided in the SAE GW 9 and/or in the eNodeBs 10 of the access network. The enabler 12 determines the communication costs from a first node of the collaborative network to the potential second correspondent nodes, based on the topology of the underlying physical network and dynamic network information, such as the link loads on the links to the core network and the predicted or estimated quality of the radio channels to terminals connected to the eNodeBs.

Figure 6:
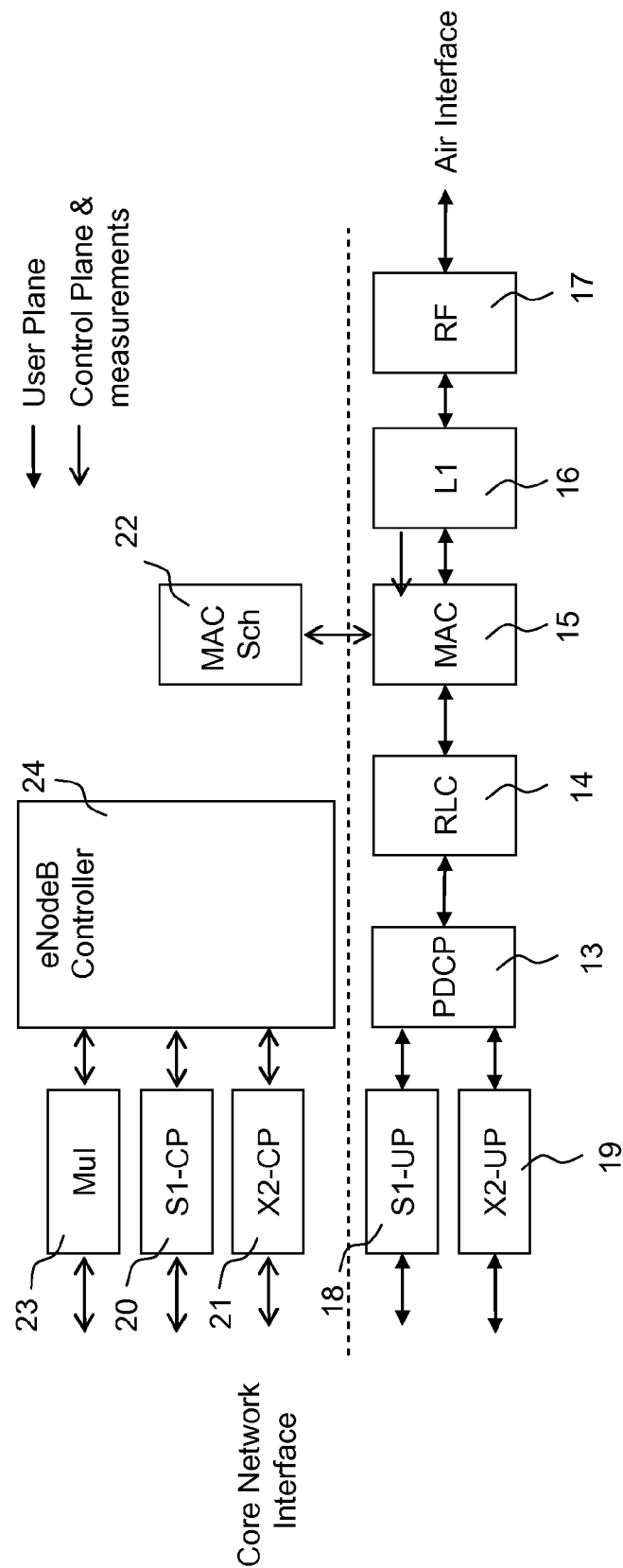
FIG. 6 illustrates the internal structure of an eNodeB.

FIG. 6 illustrates the internal structure of an eNodeB 10 including the interface to the core network and the air interface. The eNodeB 10 can be divided into user plane processing modules (below the dashed line) and control plane processing modules (above the dashed line). The purpose of the user plane is to transparently forward packets between the core network gateway (SAE GW) and the UEs. The user plane is comprised of processing modules that use protocols specified by the 3rd Generation Partnership Project (3GPP). These modules include a Packet Data Convergence Protocol (PDCP) module 13, a Radio Link Control protocol (RLC) module 14, a Medium Access Control protocol (MAC) module 15, and a Layer 1 module 16. The eNodeB 10 also has a radio frequency (RF) interface 17 to the UEs, a user plane interface (S1-UP) 18 to the SAE GW in the core network and a user plane interface (X2-UP) 19 for forwarding messages between neighbouring eNodeBs 10.

The purpose of the control plane is to manage the network resources and the connections to the UEs, including bearer setup and handover. This is controlled via an S1-CP interface 20 to the MME 6 and an X2-CP interface 21 to neighbouring eNodeBs 10. The control plane also includes the MAC scheduler 22, providing optimisation of the air interface.

The MAC scheduler 22 maintains information about the traffic buffered in the user plane, the QoS contract to each UE and the radio propagation to each UE. The MAC scheduler 22 determines what data the eNodeB will transmit to or receive from UEs over the air interface, and how. The MAC scheduler 22 also receives measurements of the properties of the air interface from both the Layer 1 uplink processing and from the UEs by means of measurement reports.

The eNodeB 10 also has an MuI interface 23 to the NM node 7. This interface may optionally also carry time information using Network Time Protocol (NTP) or Precision Time Protocol (PTP) (IEEE1588), to control the time and frequency generation of the eNodeB. Typically, NTP/PTP messages are sent 1-10 times a second, and the delay of each message is determined by the eNodeB.

Figure 7:
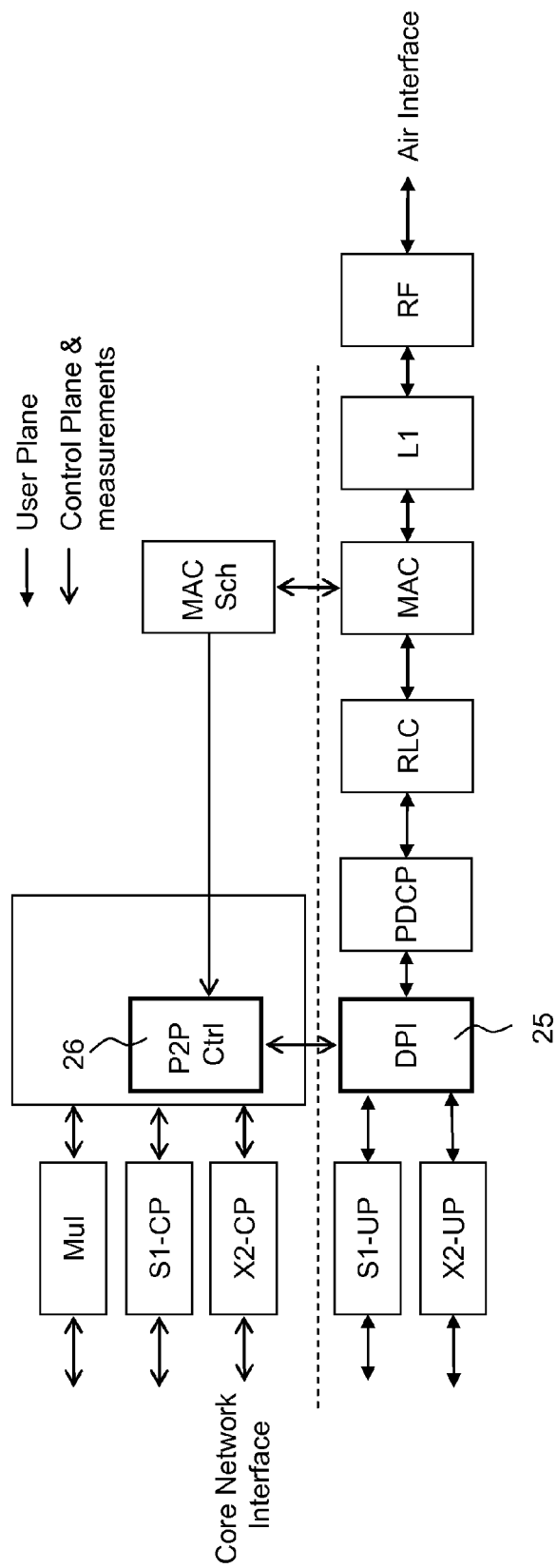
FIG. 7 illustrates the internal structure of an eNodeB in which it has been enhanced with enabler functionality according to an embodiment of the present invention.

FIG. 7 illustrates the internal structure of an eNodeB 10 in which it has been enhanced with enabler functionality according to an embodiment of the present invention. In the user plane, a Deep Packet Inspector (DPI) 25 has been added. The purpose of the DPI 25 is to investigate the content of the user plane packets in order to identify packets involved in the control plane of a collaborative application, e.g. a message containing a list of neighbours or messages used in measuring the RTT between nodes.

Any packets identified by the DPI 25 as being involved in the control plane of a collaborative application are forwarded to a new P2P control function 26 in the control plane (e.g. in the eNodeB controller 24). The P2P control function 26 also receives the following inputs:

From the NM node over the MuI interface 23, the transport network topology, including the maximum bit rate on different interfaces;

From the UP and the NTP server, the load on the links, as determined by investigating the packet loss and the propagation delay;

From the MAC Scheduler 22, the current and predicted air interface properties to each UE, and the additional bit rate it is possible to send to each UE, based on the air interface properties, air interface load, and other bearers currently used by the UE;

From the DPI 25, the IP addresses of the UEs attached to the eNodeBs;

From neighbouring eNodeBs over the X2-CP interface 21, or from the SAE GW over the S1-CP interface 20, information about the IP addresses of UEs served by neighbouring eNodeBs, or the air interface quality and capacity conditions of other eNodeBs. This may be required to calculate the cost of a peer-to-peer (end-to-end) path that involves another eNodeB.

The P2P control function 26 can also receive information about the load on the X2 link 21. This is useful if the load on the link is different in different directions.

In addition, the P2P control function can initiate communication to a UE that is a candidate peer data source, e.g. by initiating transmission of a Radio Resource Control (RRC) protocol message, in order to update the information relating to the properties of the air interface for that UE. The transmission of such a communication will update the MAC Scheduler with the current radio link quality to the candidate UE.

Furthermore, as the transport topology may be such that there are multiple hops between two eNodeBs, an operator may want to rely on more sophisticated methods to collect the topology information, as well as dynamic capacity and load related information of the links in the network. For example, the P2P control function could be provided with an interface toward the transport network management system, which has knowledge of the transport topology and which should also possess some dynamic load/free capacity related information. Alternatively, the transport network routing protocols could be enhanced to propagate and carry link load related information, e.g. by flooding link load related information in the Opaque Link State Advertisement (LSA) message of Open Shortest Path First (OSPF) protocol (as described in RFC3630, Traffic Engineering (TE) Extensions to OSPF Version 2). There are similar extensions to the other widely deployed link state routing protocols, such as the Intermediate System to Intermediate System (IS-IS) protocol. If the underlying network is an Ethernet network instead of an IP network, the Generalised Multi Protocol Label Switching (GMPLS) control plane of the Ethernet network can still utilise the OSPF or IS-IS protocol to flood the network with topology and link capacity related information.

The P2P control function uses this information to calculate the cost of communication with each of the potential correspondent nodes and influences the control plane of a collaborative application in order to reflect the calculated the costs. The calculated cost can be based on any one, or a combination of the network topology, the available bandwidth on network links, the administrative cost of network links, the load on network links, the Quality of Service of the network links the security of the network links, the current/predicted air interface properties etc.

Figure 8:
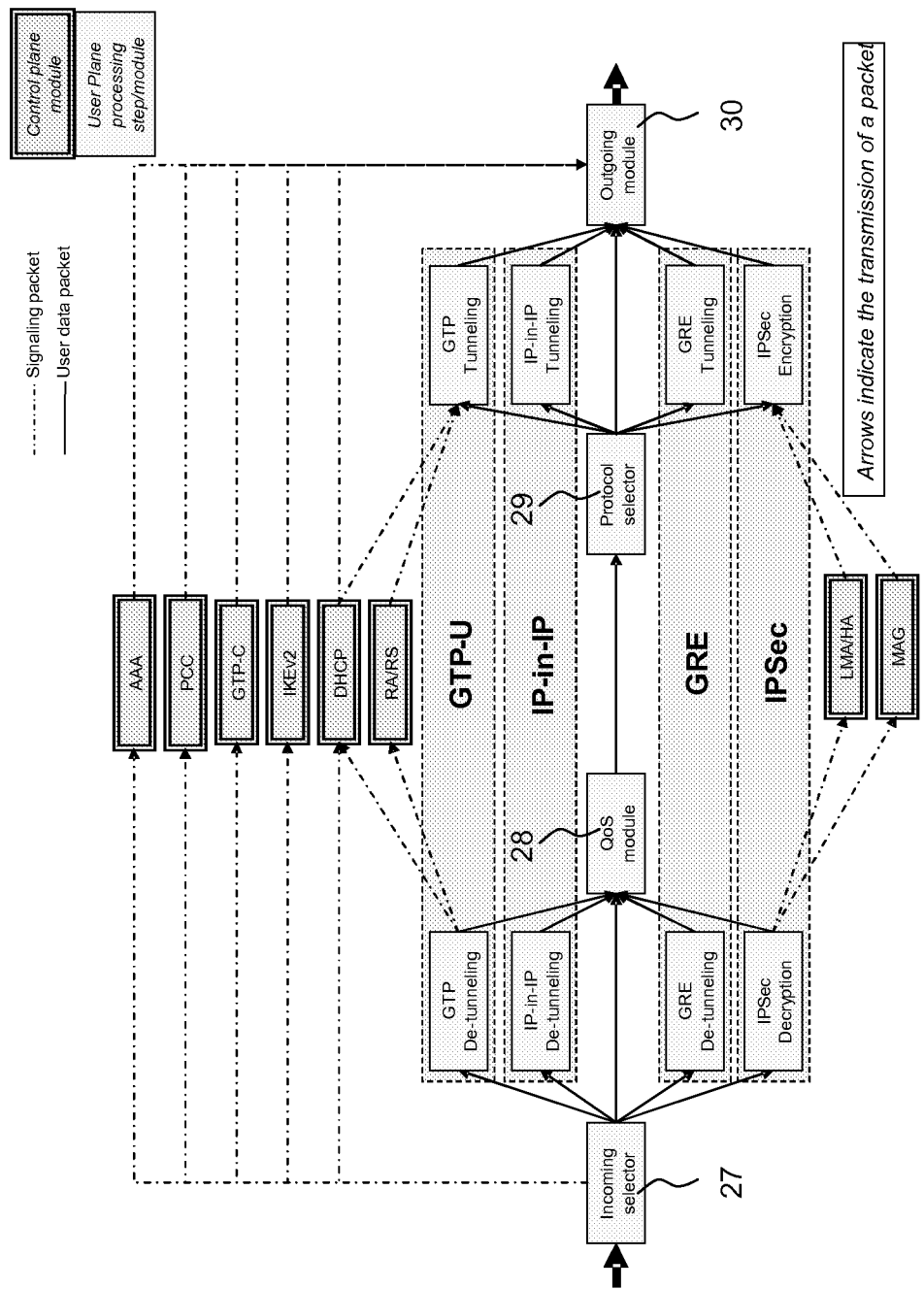
FIG. 8 illustrates the internal structure of an SAE GW.

FIG. 8 illustrates the planned internal structure of an SAE GW, implementing the 3GPP Serving GW and the 3GPP Packet Data Node (PDN) GW. A packet arriving from the router underlying the SAE GW is sent through an incoming protocol selector 27 that decides which module has to process the packet. If a packet is a user plane packet it will also decide which module has to decapsulate and/or decrypt the packet, depending upon the type of tunneling that was used to transmit the packet between the eNodeB and the serving GW, or between the serving GW and the PDN GW (e.g. GPRS Tunneling Protocol (GTP), Generic Route Encapsulation (GRE) protocol, or Proxy Mobile IP (PMIP) etc).

After decapsulation, QoS policies are applied to the packet in the QoS module 28 and then another protocol selector 29 determines how the packet will be sent (e.g. plainly, encrypted with IPSec, tunneled etc). The outgoing module 30 forwards the packet back to the underlying IP router.

Figure 9:
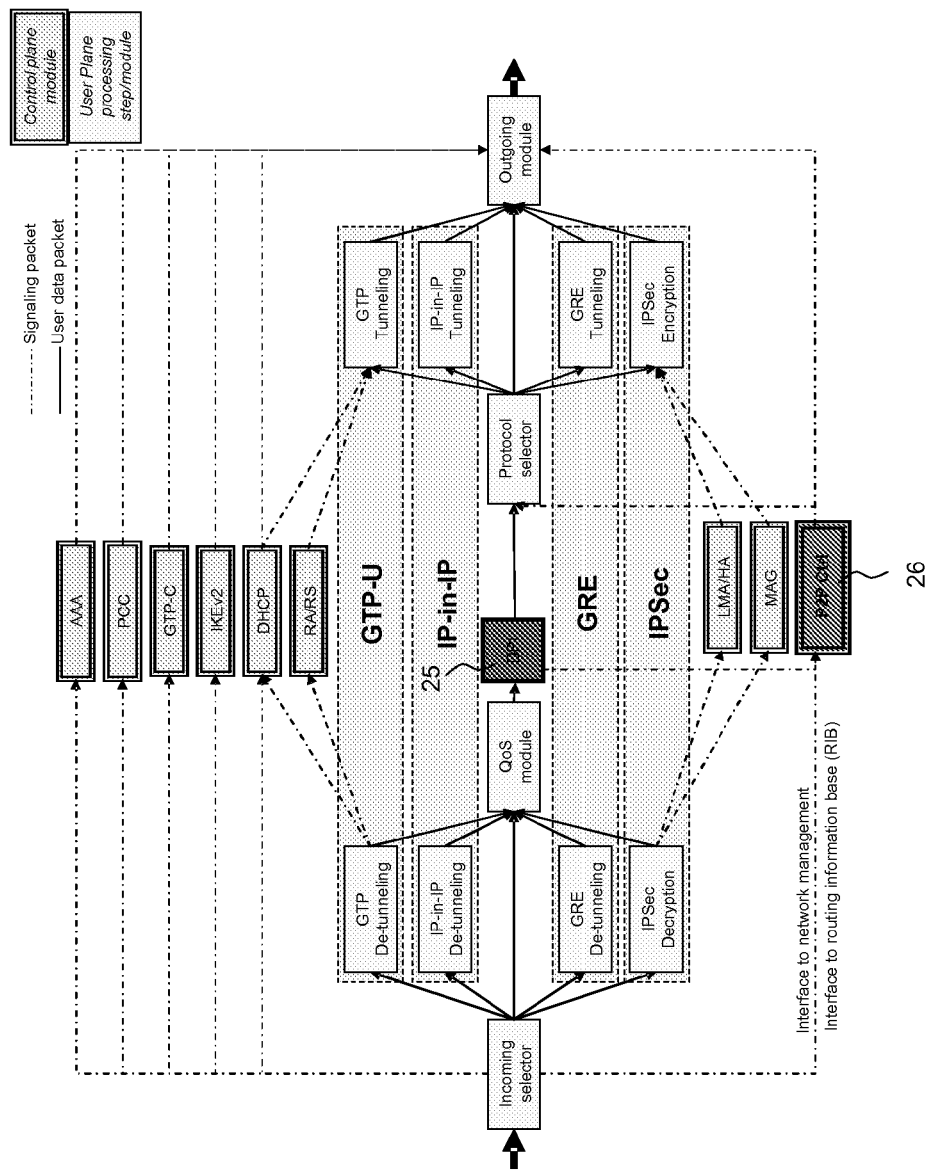
FIG. 9 illustrates the internal structure of an SAE GW in which it has been enhanced with enabler functionality according to an embodiment of the present invention.

FIG. 9 illustrates the internal structure of an SAE GW in which it has been enhanced with enabler functionality according to an embodiment of the present invention. Within the SAE GW a DPI module 25 is ideally added either directly before or directly after the QoS module. At this stage the packet has been stripped of all unnecessary headers and decrypted and the DPI module 25 can identify packets involved in the control plane of a collaborative application i.e. packets containing peer lists or used in RTT measurements, and forwards these packets to the P2P control function.

A P2P control function 26 is also added in the control plane. In order to acquire the information it needs to estimate the costs, the P2P control function 26 within the SAE GW is connected to network Operation and Maintenance (OAM) systems and/or to the underlying router's routing information base (RIB) from where it can collect dynamic network state and topology information. The RAN transport network and air interface related information is inferred by the SAE GW.

The P2P control function uses this information to calculate the cost of communication with each of the potential correspondent nodes and influences the control plane of a collaborative application in order to reflect the calculated costs. The calculated cost can be based on any one, or a combination of the network topology, the available bandwidth on network links, the administrative cost of network links, the load on network links, the Quality of Service of the network links the security of the network links, the current/predicted air interface properties etc.

In addition, the SAE GW may also infer from the OAM system whether or not the eNodeB of the data requesting UE is capable of performing the enabler function in order to manipulate the data source selection. If it is, then the SAE GW may decide to let the eNodeB handle any collaborative application control plane packets as it is likely to have more recent network information.

The enabler function can also further enhance the optimisation of collaborative applications in access networks that make use of local switching or route optimisation. Normally user plane packets are tunneled (e.g. using GTP or PMIP) up to the PDN GW, even if the other communicating party is within the same mobile network, at a neighbouring eNodeB or even if it is at the same eNodeB. "Local switching" provides that packets can be routed back to the RAN by the serving gateway if both parties are in the same mobile network segment. Local switching can also be applied within the RAN itself, i.e. when communications between two terminals within the same RAN segment (e.g. at neighbouring or close eNodeBs, or at the same eNodeB) are routed directly within the RAN without having to go up to the serving gateway in the core network. An enabler within an SAE GW could determine that a traffic flow can be switched either within the eNodeB or to another eNodeB over the X2-UP interface. Alternatively, an enabler within an eNodeB could determine that the traffic can be switched locally, within the eNodeB, or that the flow can be switched directly to a neighbouring eNodeB over X2-UP. This could be achieved by making use of the DPI module as a router to decrease the load on the interface to the core network, and to enhance the user experience, with the routing table of the DPI module updated as required. The shortest possible, locally switched route can then be used as a basis for the cost calculation performed by the P2P controller.

In addition, a user in a visited network may also start using a collaborative application. In such a situation, all the traffic to/from the visitor UE would normally be routed via a PDN gateway of the home network. In such circumstances, an enabler in the home PDN gateway could influence node selection such that nodes in the home network are selected. However, "local breakout" allows traffic to be routed directly to its destination by the visiting network, without having to go via the home network. As such, an enabler within a visited network for which local breakout is used, could direct traffic from a node of a collaborative network to other nodes of the collaborative network that are also within the visited network and are likely have the lowest communication cost. Whilst a PDN gateway will know whether local breakout is possible for a particular UE, the core network would need to communicate this to the eNodeB. This could be achieved by extending the S1-CP interface between the MME and the eNodeB with this information.

The enabler within an eNodeB or a SAE-GW can build a topological graph enhanced with almost real-time load information. At the same time, the known IP addresses of UEs served by the same eNodeB/SAE-GW are added as "sub-leaves" onto the graph. If for a particular UE, any of these IP addresses are those of potential correspondent UEs then the cost between them (source IP address, target IP address) is calculated and the addresses are ordered in inverse proportion to the cost.

The cost for the communication transport between two nodes can be a function of the capacity/free capacity along the communication path including the core network and air interfaces, the estimated quality of the radio channel of the nodes, the load/utilisation of the communication path and the cost of capacity along the communication path. For example, if the path between two nodes consist of i links where i=1 . . . n, and $f_i$ is the free capacity on link i, $c_i$ is the total capacity of link i, and $a_i$ is the administrative cost of capacity of link i, then the cost of the path between two nodes could be defined as:

$$\text{cost} = \frac{1}{\min_{i=1}^{n}(f_i)} \cdot \sum_{i=1}^{n} a_i$$

where the capacity $c_i$ of the link is included as a factor within $a_i$.

The radio interface can be modelled as one link in the above cost function. The capacity of a cell is a function of both the hardware resources and the current traffic scenario, and the most important variables are:

u_bitrate: Used bitrate in the cell/max bitrate supported by the eNodeB;

u_power_DL: Used downlink transmission power/max transmission power in the cell;

u_power_UL: Used uplink transmission power/max transmission power in the UE; and u_BW: Used bandwidth/available bandwidth, where the bandwidth can be expressed in frequency (LTE) or codes (CDMA).

These variables can be used to calculate the free bit rate available for the UE:

f_cell_bitrate=max bitrate supported by the eNodeB— Used bitrate in the cell f_ue_bitrate=max bitrate supported by the UE—Used bitrate by the UE f_cell_power=(max transmission power−used transmission power)*bit_per_watt, where the bit_per_watt for the UE is based on the history of link adaptation to the UE. The remaining eNodeB transmission power is used for the downlink, and the remaining UE transmission power is used for the uplink;

f_cell_BW=(available bandwidth−used bandwidth)* bit_per_hertz, where the bit_per_hertz for the UE is derived based on the history of link adaptation to the UE.

Taking into account the link adaptation history for the specific UE when calculating both the f_cell_power and the f_cell_BW, ensures an accurate estimation of the bit rate equivalent of the free resources. The free bit rate then becomes f_resources=min(f_cell_bitrate, f_cell_power, f_cell_BW)

The total capacity for the radio link can be determined in a similar way:

c_cell: max bitrate supported by the cell, based on the hardware capabilities, bandwidth and inter-cell interference levels, e.g. derived by tracking UE measurement reports;

c_ue_HW: max bitrate supported by the UE hardware;

c_ue_history: max bitrate based on history of link adaptation.

The bitrate capacity can also be limited by policies, such as maximum allowed transmission to that UE based on the subscription type, radio bearer type, and the amount of other higher priority transmissions in the cell. This is denoted the c_ue_policy.

This gives the following input to the cost function:

c=min (c_ue_history, c_ue_HW, c_cell, c_ue_policy)

f=min(f_resources, c−ongoing transmissions to the UE)

The utilization of the link can now be calculated as:

u=f/c.

An enabler using such a cost function can calculate the cost of communication with each potential correspondent node and use these costs to influence the RTT value measured by a first node of a collaborative network, or to influence a list of correspondent nodes provided to the node. However, the calculated cost can be based on any one, or a combination of the network topology, the available bandwidth on network links, the administrative cost of network links, the load on network links, the Quality of Service of the network links the security of the network links, the current/predicted air interface properties etc.

The methods described here provide that the bandwidth efficiency of multi-source collaborative applications can be optimised, using topological information and real-time measurements of the underlying physical network to influence the selection of correspondent nodes, such that a node preferably communicates with other those nodes with the lowest costs.

This in-turn improves the experience of end-users when using applications where the requested content can be downloaded from multiple sources, e.g. P2P file sharing applications, content distribution networks, Distributed Hash Table creation and maintenance process etc, leading to better customer satisfaction.

Furthermore, when combined with techniques for local switching, the methods described reduce the traffic sent over the core network, as local nodes are selected for collaboration and traffic is routed back in the serving gateway before penetrating the core network. This also provides efficient RAN operation, reducing operator costs.

The distributed enabler function described here provides a number of advantages:

Efficiency—the solution described here provides that the peer selection logic is implemented locally, based on the current conditions. As has been recognised here, the nodes in the network that are traversed by the P2P-like traffic are already aware of their own status, and when enhanced with knowledge about the cost of communicating with other nodes, they are the most efficient location to implement the peer selection logic.

Transparency—the solution described here does not require any cooperation from the user's P2P application and can therefore improve the P2P traffic distribution in the network, whilst remaining transparent to the P2P application. However, it can also provide an API that can be used by the P2P application.

Load—the solution described here provides that the load of implementing the peer selection logic is distributed across the network, and does not rely on placing this load on a centralised node.

Simplicity—the solution described here provides that different policies can be applied for different parts of the network and that updating these policies on-the-fly depending on changes in the operator's policy, dynamic status, network deployment, etc, is straightforward.

Adaptability—the solution described here provides that the system is more dynamic and therefore adapts easier to changes in the network. It also makes use of (almost) real-time information about the current conditions in the network, which provides that optimisation is based on highly accurate information.

Scalability—the solution described here provides a distributed system that can be rapidly scaled. For example, when adding new nodes to the system the new nodes themselves will be provided with enabler functionality, and no changes need to be made to other parts of the network.

It will be appreciated by the person of skill in the art that various modifications may be made to the above-described embodiments without departing from the scope of the present invention. For example, although an embodiment has been described with reference to peer-to-peer networking over an Evolved Packet System mobile communications network, the methods described herein are equally applicable to any scenario wherein one or more correspondent nodes of a collaborative network must be selected from a number of possible correspondent nodes distributed throughout a physical network.

The invention claimed is:

1. A method of selecting a data source node from a plurality of data source nodes, the selected data source node being used to send data to a data requesting node over a packet data network, the method comprising:

at an intermediate node of the packet data network, intercepting at least one message sent to or from the data requesting node, the at least one message relating to data source node suitability;

determining a cost of communication between the data requesting node and each of the plurality of data source nodes to which the at least one message relate; and influencing data source node suitability information sent to the data requesting node to take account of a cost to enable the data requesting node to use the data source node suitability information to select the selected data source node;

wherein influencing the data source node suitability information comprises imposing an artificial delay on the at least one message such that the artificial delay is based on the cost of communication between the data requesting node and each of the plurality of data source nodes to which the at least one message relates; and wherein the artificial delay for a first one of the plurality of data source nodes to which the at least one message relates is greater than the artificial delay for a second one of the plurality of data source nodes to which the at least one message relates when the cost of communication between the data requesting node and the first one of the plurality of data source nodes is greater than the cost of communication between the data requesting node and the second one of the plurality of data source nodes;

wherein the at least one message relating to the data source node suitability sent to or from the data requesting node are round-trip time request or round-trip time reply messages relating to at least one of the plurality of data source nodes, influencing the data source node suitability information sent to the data requesting node comprises:

influencing the round-trip time reply message sent to the data requesting node from the at least one of the plurality of data source nodes;

wherein influencing the round-trip time reply message comprises:

generating and sending a simulated round-trip time reply message to the data requesting node, such that a round-trip time indicated to the data requesting node depends on the cost of communication between the data requesting node and the at least one of the plurality of data source nodes such that the round-trip time is lower for data source nodes of the plurality of data source nodes having a lower cost of communication.

2. A method as claimed in claim 1, wherein influencing the round-trip time reply message comprises:

imposing the artificial delay on the round-trip time reply message sent to the data requesting node from the at least one of the plurality of data source nodes, such that the round-trip time indicated to the data requesting node depends on the cost of communication between the data requesting node and the at least one of the plurality of data source nodes.

3. A method as claimed in claim 2, wherein the imposed delay is proportional to the cost of communication between the data requesting node and the at least one of the plurality of data source nodes.

4. A method as claimed in claim 2, wherein the imposed delay is selected from at least a first preconfigured delay and a second preconfigured delay, with the first preconfigured delay being shorter than the second preconfigured delay and the first preconfigured delay being imposed on the round-trip time reply message relating to the one of the plurality of data source nodes with a lowest cost of communication.

5. A method as claimed in claim 1, wherein if the at least one message relating to the data source node suitability sent to or from the data requesting node is a message containing a list of potential data source nodes of the plurality of data source nodes, influencing the data source node suitability information sent to the data requesting node comprises:
   modifying the list such that the potential data source nodes appearing in the list or an order of the potential data source nodes in the list depends on the cost of communication between the data requesting node and the potential data source nodes.

6. A method as claimed in claim 1, wherein the packet data network is an Evolved Packet System mobile communications network and wherein the intermediate node is an evolved NodeB or a System Architecture Evolution Gateway.

7. A method as claimed in claim 1, wherein if the data requesting node is connected to a visited network, and traffic to and from the data requesting node is routed through a home network of the data requesting node, the intermediate node is a node of the home network.

8. A method as claimed in claim 1, wherein the cost of communication between the data requesting node and the at least one of the plurality of data source nodes can be determined based on at least one of:
   network topology;
   available bandwidth on network links;
   administrative cost of network links;
   load on network links;
   Quality of Service of network links;
   security of network links; and
   current/predicted air interface properties.

9. A non-transitory recording medium storing computer interpretable instructions for causing a programmable computer to perform a method of selecting a data source node from a plurality of data source nodes, the selected data source node being used to send data to a data requesting node over a packet data network, the method comprising:
   upon receipt of at least one message sent to or from the data requesting node, the at least one message relating to data source node suitability, determining a cost of communication between the data requesting node and each of the plurality of data source nodes to which the at least one message relates, and influencing data source node suitability information sent to the data requesting node to take account of a cost to enable the data requesting node to use the data source node suitability information to select the selected data source node;
   wherein influencing the data source node suitability information comprises imposing an artificial delay on the at least one message such that the artificial delay is based on the cost of communication between the data requesting node and the each of the plurality of data source nodes to which the at least one message relates; and
   wherein the artificial delay for a first one of the plurality of data source nodes to which the at least one message relates is greater than the artificial delay for a second one of the plurality of data source nodes to which the at least one message relates when the cost of communication between the data requesting node and the first one of the plurality of data source nodes is greater than the cost of communication between the data requesting node and the second one of the plurality of data source nodes;
   wherein the at least one message relating to the data source node suitability sent to or from the data requesting node are round-trip time request or round-trip time reply messages relating to at least one of the plurality of data source nodes, influencing the data source node suitability information sent to the data requesting node comprises:
      influencing the round-trip time reply message sent to the data requesting node from the at least one of the plurality of data source nodes;
   wherein influencing the round-trip time reply comprises:
      generating and sending a simulated round-trip time reply message to the data requesting node, such that the round-trip time indicated to the data requesting node depends on the cost of communication between the data requesting node and the at least one of the plurality of data source nodes such that the round-trip time is lower for data source nodes of the plurality of data source nodes having a lower cost of communication.

10. An apparatus for use in a packet data network, the apparatus comprising:
   a receiver for intercepting at least one message sent to or from a data requesting node;
   an inspection unit for identifying at least one message that relates to a suitability of one or more data source nodes for sending data to the data requesting node;
   a cost control unit for determining a cost of communication between the data requesting node and each of the one or more data source nodes to which the at least one identified message relates, and influencing data source node suitability information sent to the data requesting node to take account of a cost to enable the data requesting node to use the data source node suitability information to select a data source node by imposing an artificial delay on the at least one message that relates to the suitability of the one or more data source nodes such that the artificial delay is based on the cost of communication between the data requesting node and the one or more data source nodes to which the at least one message relates; and
   a transmitter for sending the data source node suitability information to the data requesting node;
   wherein the artificial delay for a first one of the one or more data source nodes to which the at least one message relates is greater than the artificial delay for a second one of the one or more data source nodes to which the at least one message relates when the cost of communication between the data requesting node and the first one of the one or more data source nodes is greater than the cost of communication between the data requesting node and the second one of the one or more data source nodes;
   wherein the inspection unit identifies round-trip time request messages and round-trip time reply message sent to or from the one or more data source nodes;
   wherein the cost control unit influences the round-trip time reply messages sent to the data requesting node; and
   wherein the cost control unit generates and sends simulated round-trip time reply message to the date requesting node, such that a round-trip time indicated to the data requesting node depends on the cost of communication between the data requesting node and the one or more data source nodes such that the round-trip time is lower for the one or more data source nodes having a lower cost of communication.

11. An apparatus as claimed in claim 10, wherein the cost control unit imposes the artificial delay on the round-trip time reply messages sent from the one or more data source nodes to the data requesting node, such that a round-trip time measured by the data requesting node depends on the cost of communication between the data requesting node and the respective one or more data source nodes.

12. An apparatus as claimed in claim 10, wherein the inspection unit is configured to identify a messages containing a list of potential data source nodes from the one or more data source nodes.

13. An apparatus as claimed in claim 12, wherein the cost control unit is configured to modify the list of potential data source nodes.

14. An apparatus as claimed in claim 10, wherein the inspection unit is configured to identify at least one messages that relates to a suitability of the one or more data source nodes for sending data to the data requesting node using deep packet inspection.

15. An apparatus as claimed in claim 10, wherein the apparatus is an eNodeB or a System Architecture Evolution Gateway.

16. An apparatus as claimed in claim 10, wherein the cost control unit is configured to determine the cost of communication between the data requesting node and the one or more of data source nodes can be determined based on at least one of:
- network topology;
- available bandwidth on network links;
- administrative cost of network links;
- load on network links;
- Quality of Service of network links;
- security of network links; and
- current/predicted air interface properties.

* * * * *

UNITED STATES PATENT AND TRADEMARK OFFICE
CERTIFICATE OF CORRECTION

PATENT NO. : 9,130,960 B2  Page 1 of 1
APPLICATION NO. : 13/132582
DATED : September 8, 2015
INVENTOR(S) : Österling et al.

It is certified that error appears in the above-identified patent and that said Letters Patent is hereby corrected as shown below:

In the Specification:

In Column 9, Line 65, delete "Evolution" and insert -- Evolution (LTE), --, therefor.

In the Claims:

In Column 18, Line 50, in Claim 10, delete "messages" and insert -- message --, therefor.

In Column 18, Line 53, in Claim 10, delete "messages" and insert -- message --, therefor.

In Column 19, Line 2, in Claim 12, delete "messages" and insert -- message --, therefor.

In Column 19, Line 9, in Claim 14, delete "messages" and insert -- message --, therefor.

Signed and Sealed this
Twenty-third Day of August, 2016

Michelle K. Lee
*Director of the United States Patent and Trademark Office*